US008789889B2

(12) United States Patent
Mitsuo et al.

(10) Patent No.: US 8,789,889 B2
(45) Date of Patent: Jul. 29, 2014

(54) VEHICLE BUCKLE SUPPORT APPARATUS

(75) Inventors: Tetsu Mitsuo, Nisshin (JP); Yasuhiro Yoshida, Aichi-ken (JP); Yuki Ando, Aichi-ken (JP)

(73) Assignees: Toyota Jidosha Kabushiki Kaisha, Toyota-shi (JP); Kabushiki Kaisha Tokai Rika Denki Seisakusho, Niwa-Gun (JP)

( * ) Notice: Subject to any disclaimer, the term of this patent is extended or adjusted under 35 U.S.C. 154(b) by 17 days.

(21) Appl. No.: 13/567,846

(22) Filed: Aug. 6, 2012

(65) Prior Publication Data

US 2013/0037674 A1 Feb. 14, 2013

(30) Foreign Application Priority Data

Aug. 9, 2011 (JP) ................. 2011-174315

(51) Int. Cl.
*B60R 22/18* (2006.01)
*B60R 22/22* (2006.01)
*A62B 35/00* (2006.01)

(52) U.S. Cl.
USPC ....................................... 297/482

(58) Field of Classification Search
USPC ....................................... 297/482
See application file for complete search history.

(56) References Cited

U.S. PATENT DOCUMENTS

| | | | |
|---|---|---|---|
| 3,318,634 A | 5/1967 | Nicholas | |
| 3,608,963 A * | 9/1971 | Steere, Jr. .................. | 297/482 |
| 4,070,038 A * | 1/1978 | Bergman et al. .............. | 297/482 |
| 4,141,573 A * | 2/1979 | Ellens .......................... | 297/482 |
| 4,157,841 A * | 6/1979 | Bergman et al. .............. | 297/482 |
| 4,611,854 A * | 9/1986 | Pfeiffer ...................... | 297/482 X |
| 4,645,231 A * | 2/1987 | Takada ....................... | 297/482 X |
| 5,098,162 A * | 3/1992 | Forget et al. ................ | 297/482 |
| 6,808,207 B2 * | 10/2004 | Nakano et al. ............ | 297/482 X |
| 7,383,620 B2 | 6/2008 | Smith | |
| 7,874,581 B2 * | 1/2011 | Itoga ......................... | 297/482 X |
| 8,016,362 B2 * | 9/2011 | Itoga ......................... | 297/482 X |
| 2002/0158458 A1 | 10/2002 | Nakano et al. | |
| 2006/0254033 A1 | 11/2006 | Smith | |

FOREIGN PATENT DOCUMENTS

| | | |
|---|---|---|
| DE | 102006022087 A1 | 12/2006 |
| GB | 2244203 A | 11/1991 |
| JP | 62-039342 A | 2/1987 |
| JP | 62-039343 A | 2/1987 |
| JP | 63-046267 U | 3/1988 |
| JP | 04005148 A | 1/1992 |
| JP | 07019023 U | 4/1995 |
| JP | 2002321593 A | 11/2002 |
| JP | 2006-321477 A | 11/2006 |
| JP | 2009137321 A | 6/2009 |
| JP | 2010-023793 A | 2/2010 |
| JP | 2010023651 A | 2/2010 |
| JP | 2011-020562 A | 2/2011 |

* cited by examiner

*Primary Examiner* — Rodney B White
(74) *Attorney, Agent, or Firm* — Gifford, Krass, Sprinkle, Anderson & Citkowski, P.C.

(57) ABSTRACT

A vehicle buckle support apparatus is arranged between a console box and a seat cushion. The vehicle buckle support apparatus includes a cylindrical inner boot that covers an inner webbing that connects a buckle and an anchor plate together. A thin portion is formed in a width direction of the inner webbing, on a middle portion in a height direction of a seat-side side wall portion of the inner boot.

17 Claims, 7 Drawing Sheets

VEHICLE BUCKLE SUPPORT APPARATUS

CROSS REFERENCE TO RELATED
APPLICATIONS

This application claims priority to Japanese Patent Application No. 2011-174315 filed on Aug. 9, 2011, which is incorporated herein by reference in its entirety including the specification, drawings and abstract.

BACKGROUND OF THE INVENTION

1. Field of the Invention
The invention relates to a vehicle buckle support apparatus.
2. Description of Related Art
Japanese Patent Application Publication No. 62-039343 (JP 62-039343 A) describes technology related to a mounting structure of vehicle seat belt. Simply, an inner belt includes a resin boot formed in a thin cylindrical shape. Inside this boot, a plate-shaped mounting bracket is connected to a buckle at an upper end portion, and is retained at a lower end portion. Moreover, a flanged collar is arranged next to the mounting bracket, and the mounting bracket is connected to and supported by an anchor plate via this collar.

According to this structure, an inside surface of the boot is supported by the flange of the collar, so the inner belt is able to be kept in a stable upright state. As a result, assembly space for a console box is able to be maintained at a constant width, and problems such as the boot scraping against, and consequently damaging, the console box or a seat, and producing friction noise or the like can be eliminated.

However, with this structure, the flanged collar is arranged inside of the boot and must be attached to the floor, so the number of parts increases. Also, the structure becomes more complex, the weight increases, and cost also increases.

Meanwhile, Japanese Utility Model Application Publication No. 63-46267 (JP 63-46267 U) describes technology related to a buckle stalk for a seat belt. With this structure, a buckle and an anchor plate are connected together by an inner belt, and the inner belt in this state is set inside of a die. Resin material is poured into the die and mold formed. At this time, a plurality of long holes is formed in a side wall portion on a seat side of a resin cover member that covers the inner belt. Then, flexible elastic members are fit into the long holes.

However, the related art described in JP 63-46267 U may be construed in the following manner. The inner belt is set inside of the die, and the inner belt and the cover member are integrated by pouring resin material into the die. As a result, the rigidity of the overall inner boot becomes too high, and as a result, operability when an occupant puts on webbing deteriorates. Therefore, the plurality of long holes that are through-holes are formed in the side wall portion on a seat cushion side of the cover member, enabling the entire inner boot to flex toward the seat cushion side. Moreover, the appearance when the long holes that are through-holes are exposed is poor, so the flexible elastic members are packed inside of them.

When construed in this way, with the related art described in JP 63-46267 U, in order to ensure wearability when an occupant puts on the webbing, an extremely complex structure is employed, which is costly. In particular, when mold forming is performed, the entire inner boot must be specially designed from scratch for each vehicle model, which also results in a cost increase.

SUMMARY OF THE INVENTION

In view of the foregoing circumstances, the invention thus provides a vehicle buckle support apparatus in which both an improvement in wearability when an occupant puts on webbing, and a reduction in rattling noise produced when a buckle abuts against a console box when the vehicle is running, are able to be achieved by changing the shape and structure of the inner boot itself.

One aspect of the invention relates to a vehicle buckle support apparatus that includes i) an inner webbing that connects a buckle that is arranged between a console box and a seat cushion to an anchor plate, ii) a resin inner boot that is formed in a cylindrical shape, in which the anchor plate protrudes from one end portion of the inner boot, the inner webbing is housed in a middle portion of the inner boot, and the buckle is inserted into the other end portion of the inner boot, that keeps the buckle in an upright position, the inner boot including a seat-side side wall portion that opposes a side surface of the seat cushion, and a console-side side wall portion that opposes a side surface of the console box, and iii) a thin portion that is formed in a width direction of the inner webbing, between an upper end portion of the anchor plate and a lower end portion of the buckle, on a surface side of the seat-side side wall portion, among the seat-side side wall portion and the console-side side wall portion.

According to this aspect of the invention, the thin portion is formed in the width direction of the inner webbing, at a single location between the upper end portion of the anchor plate and the lower end portion of the buckle, on the surface side of the seat-side side wall portion of the inner boot. A thin portion is not formed on the surface side of the console-side side wall portion of the inner boot. Therefore, the inner boot is less rigid at the thin portion of the seat-side side wall portion. That is, the inner boot bends easier at the position where the thin portion is formed, and the load when the inner boot bends is determined by the thickness (and the material) of the thin portion. As a result, when an occupant puts on the webbing, the inner boot will bend toward the occupant at the thin portion, so the buckle is able to be easily tilted toward the occupant. Therefore, the tongue plate is able to smoothly engage with the buckle.

Also, the buckle is typically fitted (i.e., inserted) into the upper end portion of the inner boot, so the upper end portion side of the inner boot is heavier than the lower end portion is. Therefore, when the inner boot receives vibrations when the vehicle is running, the inner boot tends to shake to the left and right (i.e., to the seat cushion side and the console box side). However, with this invention, the thin portion is formed on the surface side of the seat-side side wall portion, but is not formed on the surface side of the console-side side wall portion, so the inner boot will bend relatively easily toward the seat cushion side, but will not easily bend toward the console box side. Therefore, the upper end portion of the inner boot will not easily strike the console box, so a rattling noise can be inhibited from being produced.

Moreover, to obtain the foregoing operation, the shape and structure of the cylindrical inner boot of this invention have been innovatively designed, so they will not lead to an increase in parts or a complex structure like the related art.

As described above, with the vehicle buckle support apparatus according to this aspect, the shape and the structure of the inner boot itself have been devised so that both an improvement in the wearability (i.e., the ease with which the webbing is able to be put on) when an occupant puts on the webbing, and a reduction in a rattling noise produced when the buckle or the like abuts against the console box when the vehicle is running, can be realized.

The vehicle buckle support apparatus may also include a reinforcing portion that is integrally formed with the seat-side side wall portion in a longitudinal direction of the inner webbing, between the thin portion and the lower end portion of the buckle, on a back surface side of the seat-side side wall portion.

According to this structure, the reinforcing structure is integrally formed with the seat-side side wall portion in the longitudinal direction of the inner webbing between the thin portion and the lower end portion of the buckle, on the back surface side of the seat-side side wall portion of the inner boot. Accordingly, the difference in rigidity between the portion where the thin portion is formed and the portion where the reinforcing portion is formed increases. Therefore, the inner boot is extremely difficult to bend at portions other than the thin portion.

As a result, the vehicle buckle support apparatus having this structure has a beneficial effect in which the bending position of the inner boot is able to be stabilized even further.

In the vehicle buckle support apparatus described above, another reinforcing portion that is different from the reinforcing portion may also be formed in a position opposing the reinforcing portion, on a back surface side of the console-side side wall portion.

According to this structure, the other reinforcing portion is also formed at a position opposing the reinforcing portion, on the back surface side of the console-side side wall portion, so the rigidity of the console-side side wall portion of the inner boot increases. Therefore, the upper end portion of the inner boot is even less apt to swing toward the console box side during vibrations when the vehicle is running are input.

As a result, the vehicle buckle support apparatus having this structure has a beneficial effect in which rattling noise produced by the upper end portion of the inner boot abutting against the console box when the vehicle is running is able to be more effectively suppressed.

In the vehicle buckle support apparatus described above, the reinforcing portion and the other reinforcing portion may each be a plurality of ribs formed linearly, and the ribs may serve as a stopper that interferes with the lower end portion of the buckle when the buckle is inserted into the other end portion of the inner boot.

According to this structure, the reinforcing portion and the other reinforcing portion are each a plurality of ribs that are formed linearly, so when the buckle is inserted into the other end portion of the inner boot, the lower end portion of the buckle interferes with the ribs. Therefore, the buckle is unable to be inserted into the inner boot any further, and as a result, the buckle is positioned with respect to the inner boot. That is, the ribs serve as a stopper.

As a result, the vehicle buckle support apparatus having this structure has a beneficial effect in which the buckle is able to be easily positioned with respect to the inner boot, which makes the assemblability of the vehicle buckle support apparatus that much better.

With the vehicle buckle support apparatus described above, the inner boot may include a front wall portion and a rear wall portion that curve from both sides of the seat-side side wall portion toward the console box side, and another thin portion may be formed at the same height as the thin portion, on at least the front wall portion, from among the front wall portion and the rear wall portion.

According to this structure, the other thin portion is additionally formed at the same height as the thin portion, on at least the front wail portion, among the front wall portion and the rear wall portion of the inner boot. Therefore, bulging at the front wall portion and the rear wall portion when the inner boot is bent toward the occupant will not stand out.

As a result, the vehicle buckle support apparatus having this structure has a beneficial effect in which the quality of the external appearance of the inner boot is able to be improved.

In the vehicle buckle support apparatus described above, the inner boot may be fixed to the anchor plate by a fastener that is inserted from one of the seat-side side wall portion and the console-side side wall portion toward the other, and a lower end portion of the seat-side side wall portion and a lower end portion of the console-side side wall portion may be joined to the anchor plate by inner tape. Also, a wire harness may be joined to the anchor plate by the inner tape and outer tape.

According to this structure, the inner boot is fixed to the anchor plate by the fastener that is inserted from one of the seat-side side wall portion and the console-side side wall portion toward the other. Therefore, the lower end portion of one of the side-wall portions is securely fixed to the anchor plate, but the lower end portion of the other side wall portion is in an unstable state with respect to the anchor plate. Therefore, the lower end portion of the seat-side side wall portion and the lower end portion of the console-side side wall portion are joined to the anchor plate by the inner tape. As a result, the lower end portion of the other side wall portion of the inner boot is also securely fixed to the anchor plate.

Furthermore, the wire harness is joined to the anchor plate by the outer tape, with the inner tape interposed between the wire harness and the anchor plate. Therefore, the wire harness and the anchor plate will not directly scrape against one another.

As a result, the vehicle buckle support apparatus having this structure has a beneficial effect in which it is possible to stabilize the mounting state of the inner boot, and inhibit or prevent abnormal noise from being produced between the wire harness and the anchor plate.

In the vehicle buckle support apparatus having this structure, a fixing piece set to a width narrower than the width of the anchor plate may be integrally formed on both a lower end portion of the seat-side side wall portion and a lower end portion of the console-side side wall portion, and the inner tape may be wound around the anchor plate so as to have a joining surface with the anchor plate in both a width direction and a protruding direction of the fixing pieces.

According to this structure, a fixing piece set to a width narrower than the width of the anchor plate is integrally formed on both the lower end portion of the seat-side side wall portion and the lower end portion of the console-side side wall portion. Also, the inner tape is wound around the anchor plate so as to have a joining surface with the anchor plate in both the width direction and the protruding direction of the fixing pieces, so the joining surface is arranged around the fixing pieces. Therefore, the fixing pieces are able to be strongly bound.

As a result, the vehicle buckle support apparatus having this structure has a beneficial effect in which the fixing pieces are able to be effectively prevented from peeling away from the anchor plate when vibrations when the vehicle is running are applied to the inner boot.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
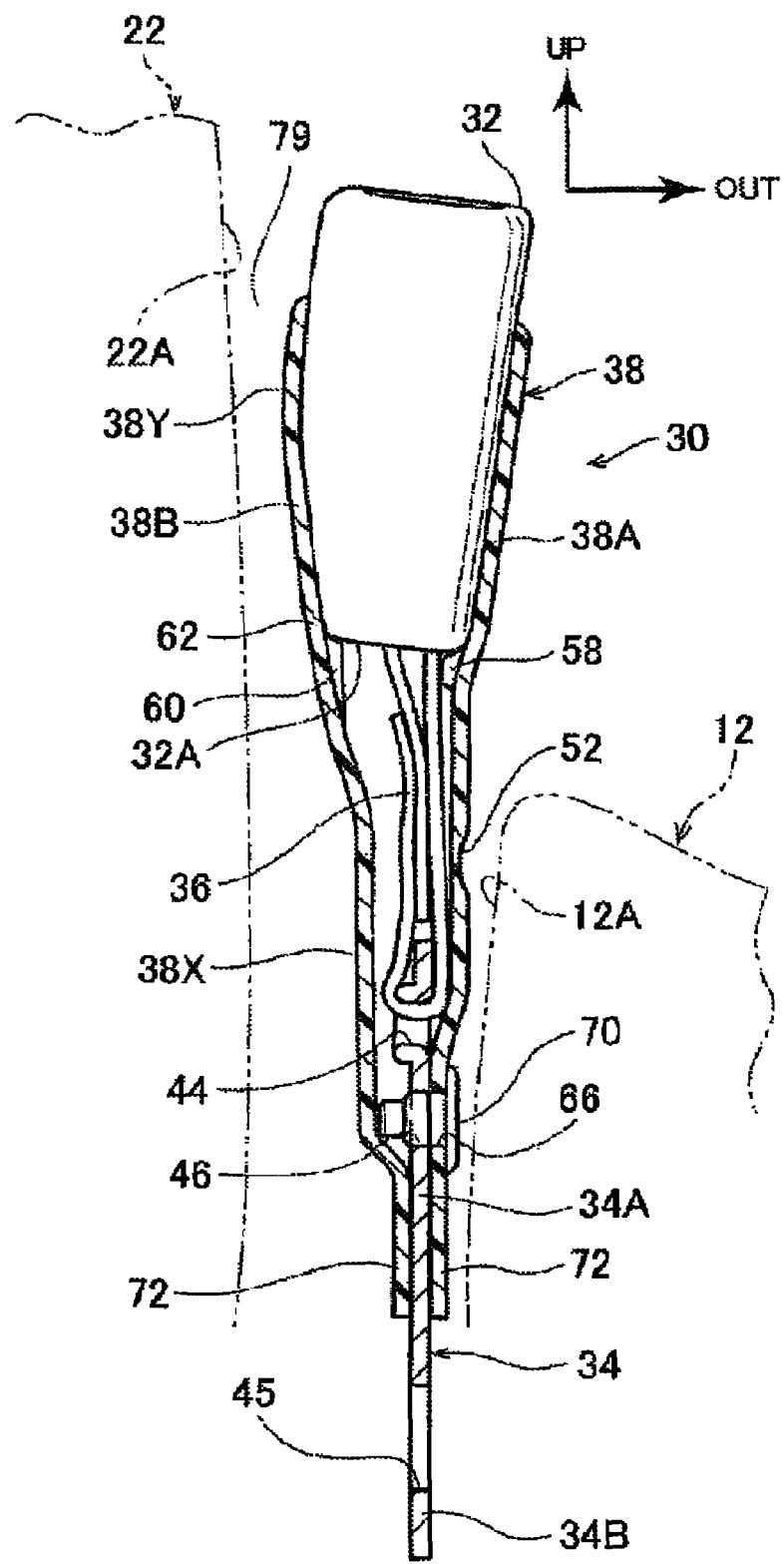
FIG. 1 is an enlarged sectional view taken along line I-I in FIG. 2, of the overall structure of a vehicle buckle support apparatus according to an example embodiment of the invention.

Hereinafter example embodiments of the vehicle buckle support apparatus according to the invention will be described with reference to FIGS. 1 to 7. In the drawings, arrow FR indicates a forward direction with respect to the vehicle, arrow UP indicates an upward direction with respect to the vehicle, and arrow OUT indicates an outward direction in the vehicle width direction, as appropriate.

Figure 2:
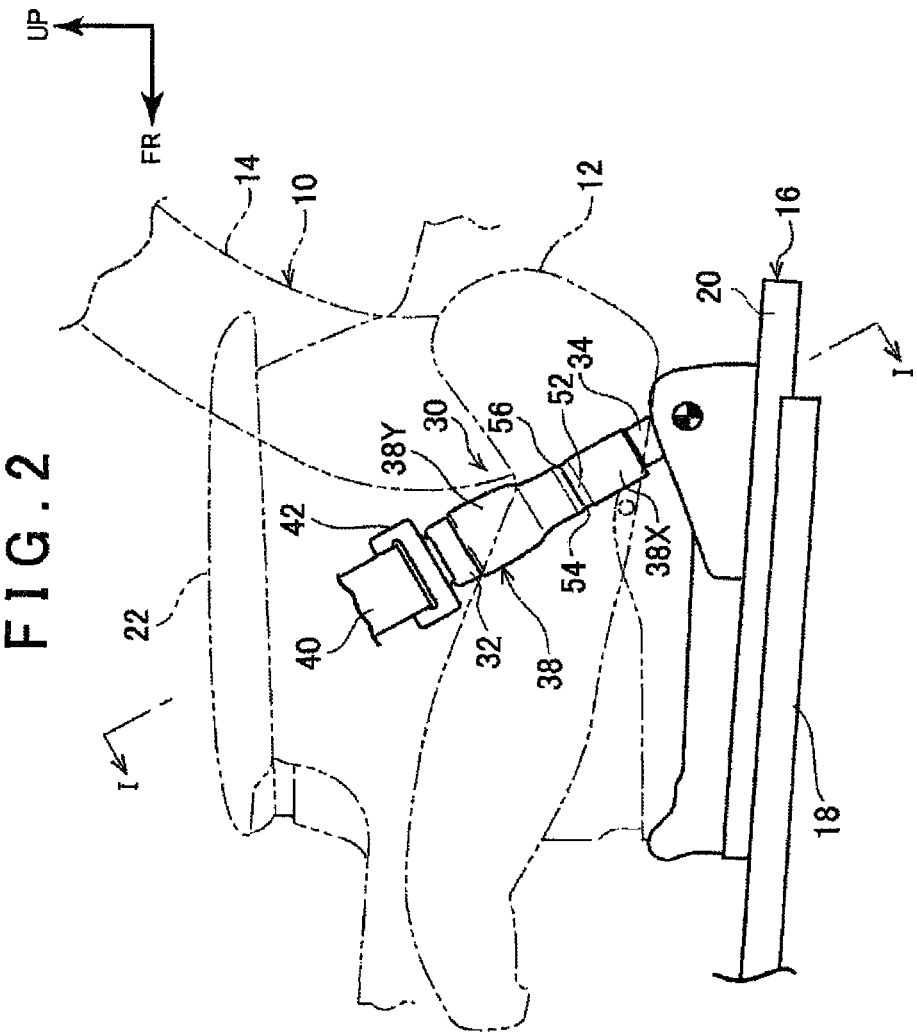
FIG. 2 is a side view illustrating the vehicle buckle support apparatus shown in FIG. 1 in a used state.

FIG. 2 is a side view of the vehicle buckle support apparatus according to this example embodiment mounted in a vehicle, with webbing in a state being worn by an occupant. As shown in this drawing, a vehicle seat 10 includes a seat cushion 12 on which an occupant sits, and a seat back 14 that is supported, in a manner so as to be able to be reclined and raised, on a rear end portion of the seat cushion 12. Also, a headrest, not shown, is supported in height-adjustable manner on an upper end portion of the seat back 14. Furthermore, a seat slide 16 for adjusting the fore-aft (i.e., longitudinal) position of the vehicle seat 10 is arranged below the seat cushion 12. The seat slide 16 includes a long lower rail 18 that is fixed to a vehicle body floor, and a long upper rail 20 that is supported so as to be able to slide in the vehicle longitudinal direction with respect to the lower rail 18.

As shown in FIG. 1, a console box 22 that has a generally rectangular parallelepiped shape that is long and thin in the vehicle longitudinal direction, is arranged between the vehicle seat 10 on the driver's side described above, and a vehicle seat on a front passenger's side, not shown. As shown in FIGS. 1 and 2, a vehicle buckle support apparatus 30 according to this example embodiment is arranged in an upright position between a side surface 22A on an outside in the vehicle width direction of the console box 22 and a side surface 12A on an inside in the vehicle width direction of the seat cushion 12. Hereinafter, the vehicle buckle support apparatus 30 will be described in detail.

Figure 3:
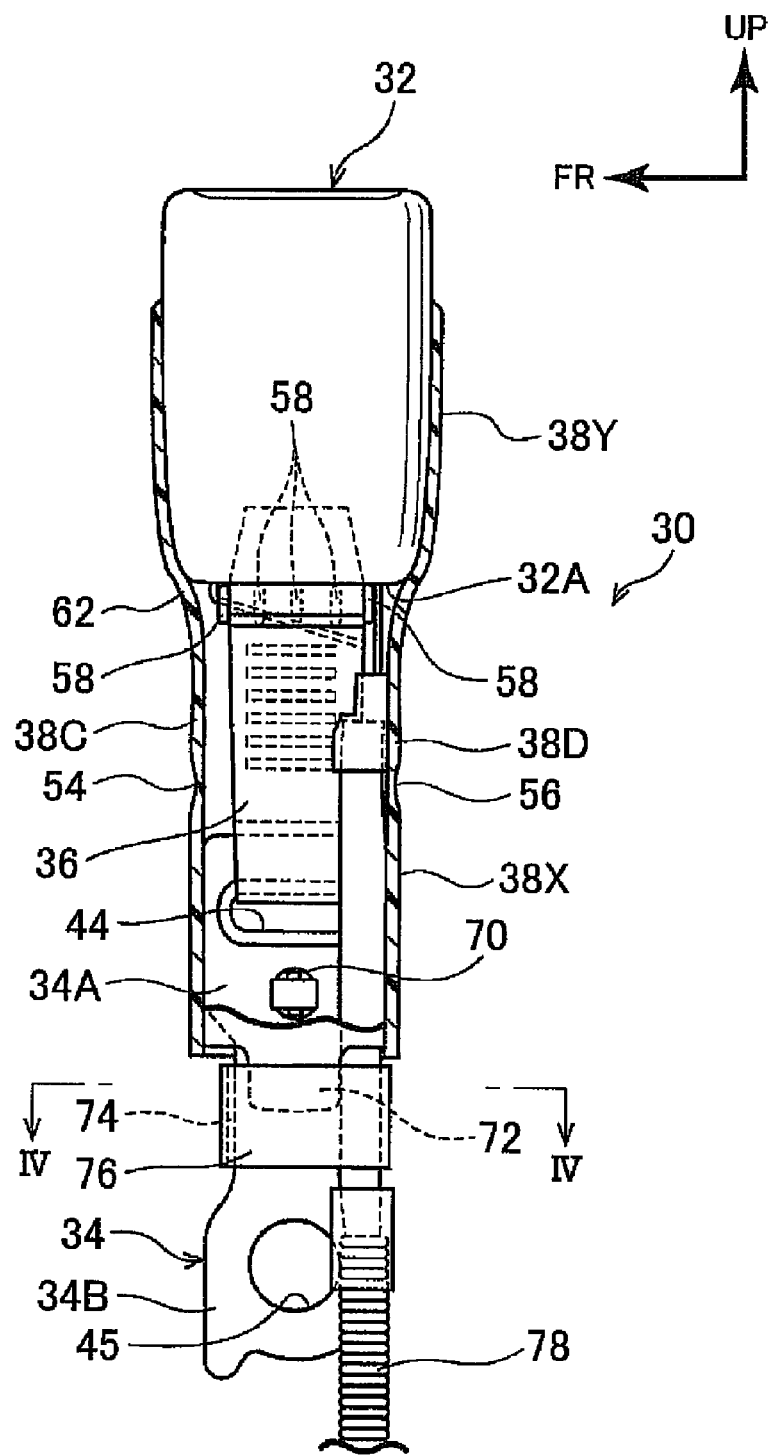
FIG. 3 is a longitudinal sectional view, as viewed from the side of the vehicle, of the vehicle buckle support apparatus shown in FIG. 1 cut along the vehicle longitudinal direction.

As shown in FIGS. 1 to 3, the vehicle buckle support apparatus 30 includes an inner webbing (belt) 36 that connects a buckle 32 and a metal anchor plate 34 together, and a cylindrical inner boot 38 that covers this inner webbing 36.

A tongue plate 42 (see FIG. 2) through which an occupant restraint webbing 40 is inserted engages with the buckle 32. One end portion of the webbing 40 is retained by an anchor member that is fixed to the vehicle body floor, and the other end portion of the webbing 40 is retained by a winding shaft of a webbing winding device. The webbing winding device is arranged on a lower portion of a center pillar or the like. Further, an intermediate portion of the webbing 40 is inserted through a shoulder anchor arranged on an upper portion of the center pillar and then doubled back. Also, a portion of the webbing 40 between the shoulder anchor and the anchor member passes through a metal tongue plate 42. An occupant is able to wear (i.e., put on) a three-point seat belt apparatus by grabbing the tongue plate 42 and engaging it with the buckle 32. At this time, the portion of the webbing 40 from the shoulder anchor to the tongue plate 42 will become shoulder side webbing, and the portion of the webbing 40 from the tongue plate 42 to the anchor member will become lap side webbing.

Meanwhile, the anchor plate 34 includes an upper portion 34A in which a long hole 44 of a length that enables the inner webbing 36 to pass through it is formed, and a lower portion 34B in which a mounting hole 45 for fastening (i.e., fixing) is formed in a center portion. The anchor plate 34 is pivotally fastened (i.e., fixed) to the upper rail 20 of the seat slide 16 using the mounting hole 45 formed in the lower portion 34B.

The inner webbing 36 is narrower in width than the occupant restraint webbing 40. The inner webbing 36 is first inserted through a long hole in a metal plate, not shown, provided inside of the buckle 32 and then through the long hole 44 formed in the upper portion 34A of the anchor plate 34, after which it is folded back over itself. The three overlapping portions of the inner webbing 36 are then sewn together, thereby connecting the buckle 32 and the anchor plate 34 together.

Figure 5:
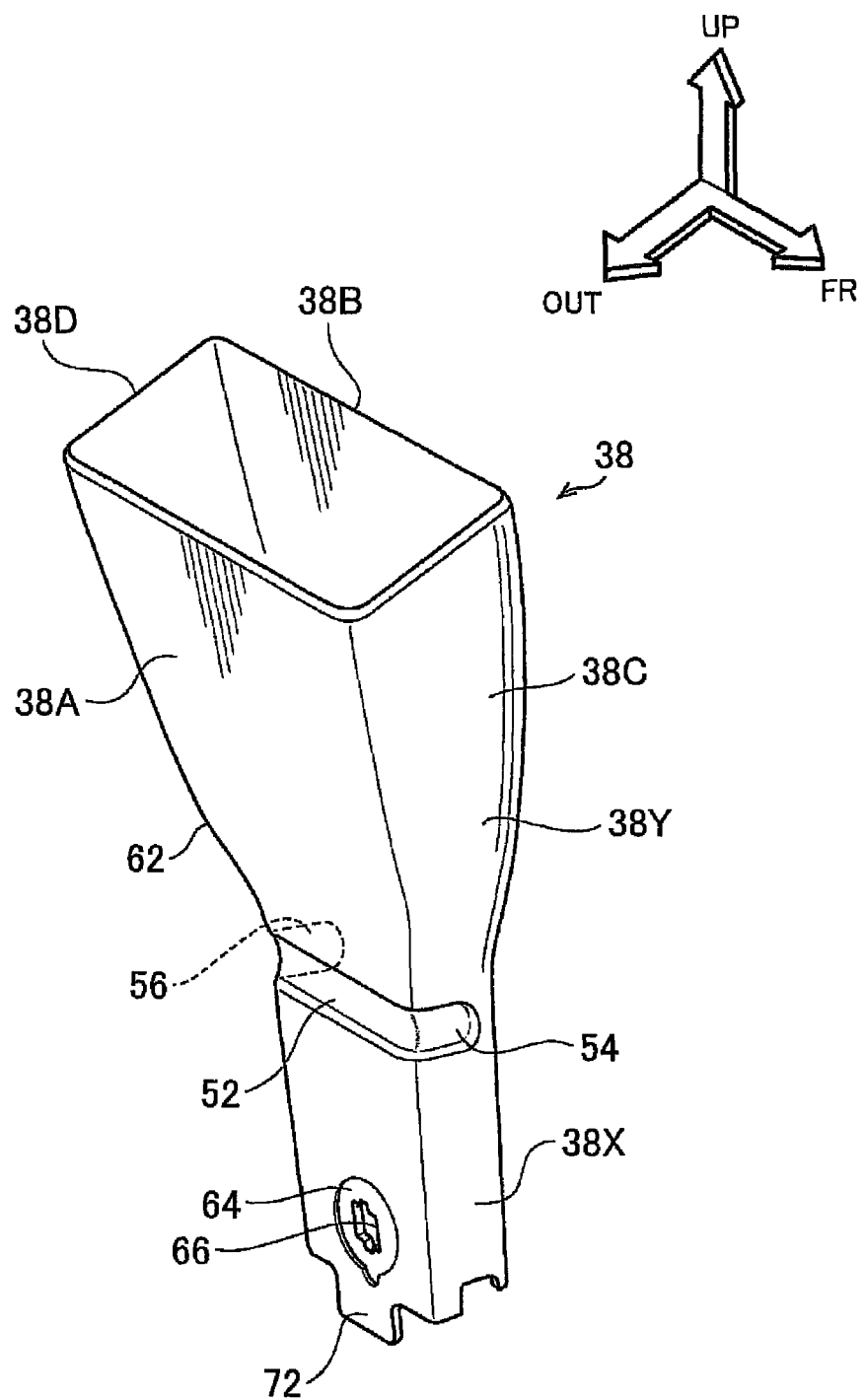
FIG. 5 is a perspective view of the inner boot shown in FIG. 1 by itself.
Figure 6A:
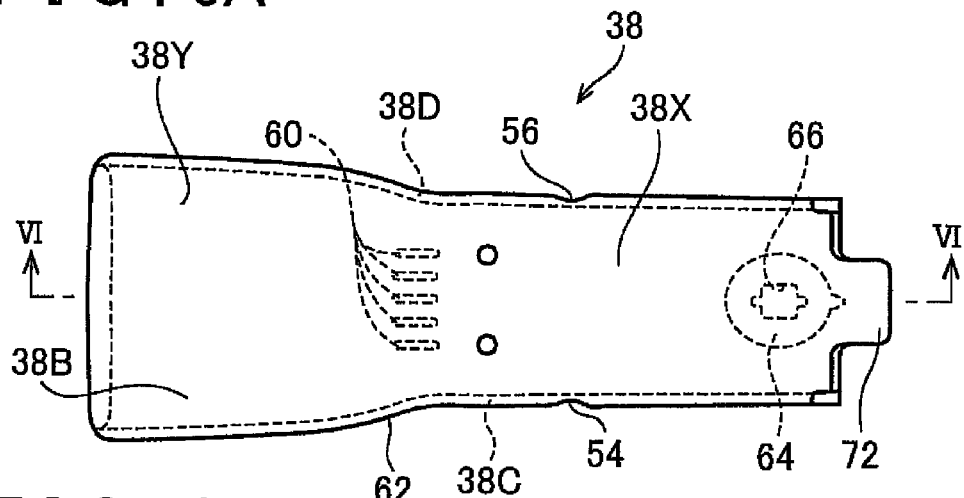
FIG. 6A is a front view of the inner boot shown in FIG. 5.
Figure 6B:
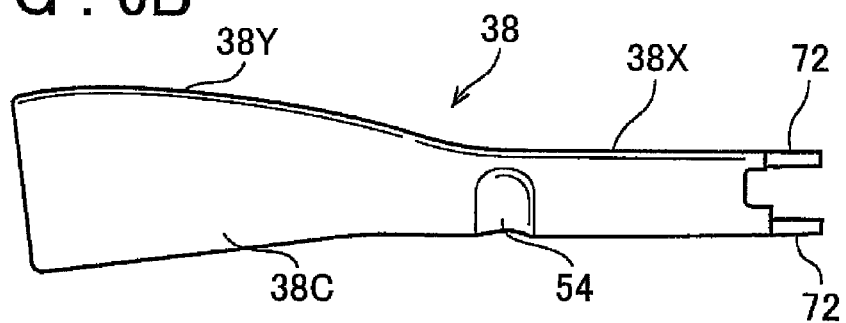
FIG. 6B is a side view of the inner boot shown in FIG. 5.
Figure 6C:
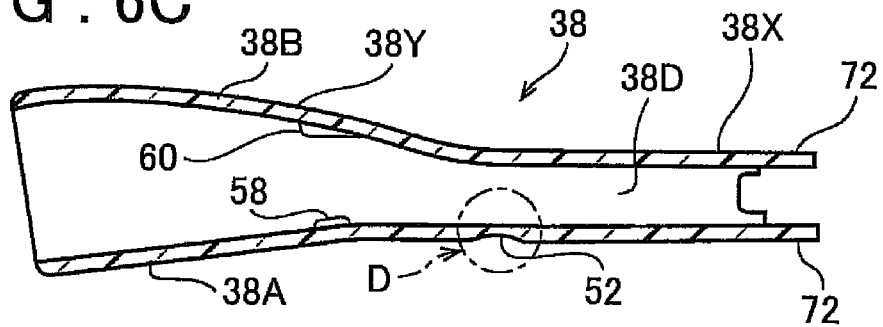
FIG. 6C is a longitudinal sectional view of the inner boot shown in FIG. 5 cut along line VI-VI in FIG. 6A.
Figure 6D:
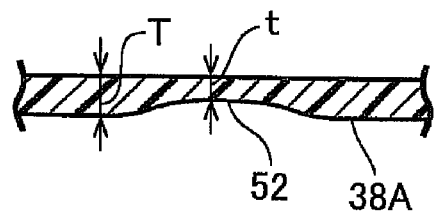
FIG. 6D is an enlarged view of the encircled portion indicated by arrow D in FIG. 6C.
Figure 7:
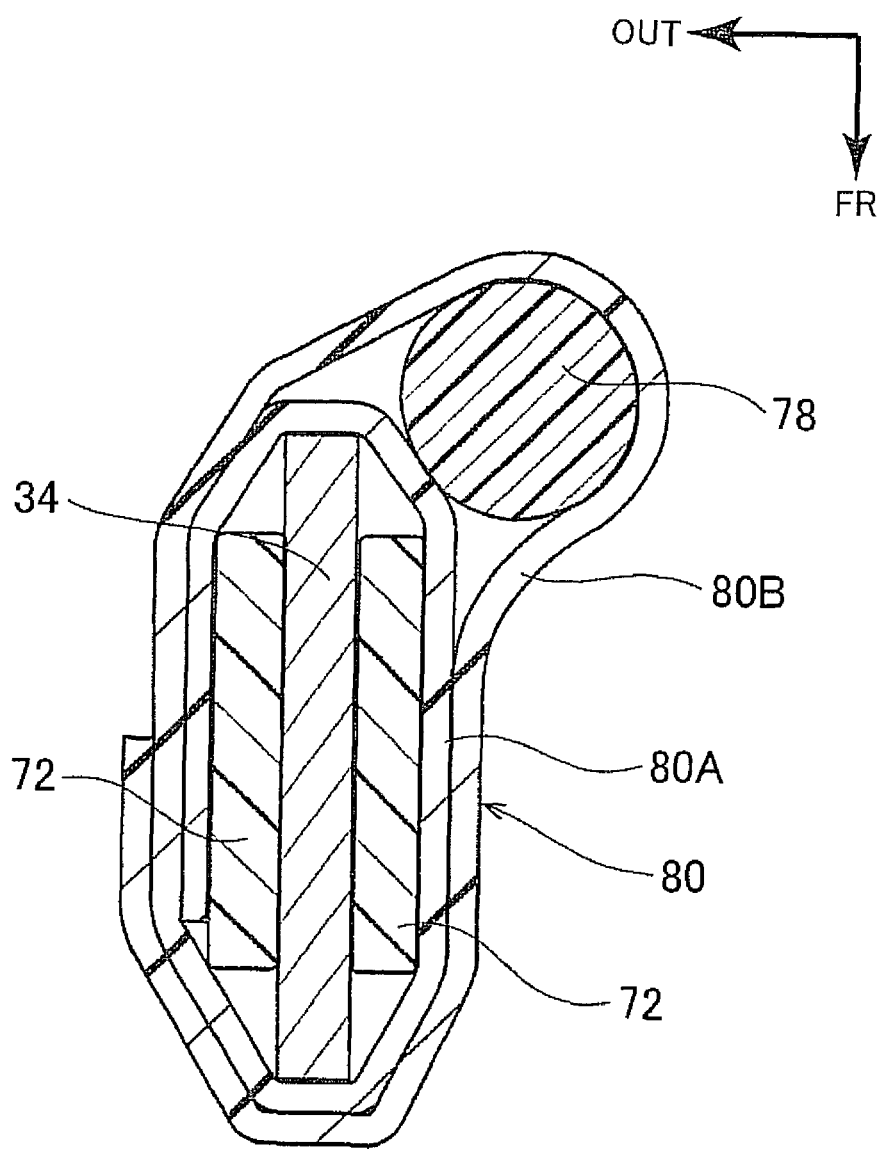
FIG. 7 is an enlarged transverse sectional view corresponding to FIG. 4, of a vehicle buckle support apparatus according to a modified example.

The inner webbing 36 described above is covered by the resin inner boot 38. FIGS. 1 to 3 are longitudinal sectional views of the inner boot 38, FIG. 5 is a perspective view of the inner boot 38, and FIG. 6A is a front view of the inner boot 38 alone. As shown in these drawings, the inner boot 38 is formed in an overall rectangular cylindrical shape. When the inner boot 38 is viewed in terms of its structure, the inner boot 38 includes four side walls. More specifically, the inner boot 38 includes a seat-side side wall portion 38A that opposes the side surface 12A on the inside in the vehicle width direction of the seat cushion 12, and a console-side side wall portion 38B that opposes the side surface 22A on the outside in the seat width direction of the console box 22. Moreover, the inner boot 38 includes a front wall portion 38C and a rear wall portion 38D that connect the seat-side side wall portion 38A and the console-side side wall portion 38B together between front and rear end portions.

Also, when the inner boot 38 is viewed in terms of shape, it is formed by a lower portion 38X that is formed in a thin rectangular cylindrical shape, and an upper portion 38Y that is formed bulging out moderately in both the width direction and the thickness direction from the upper end portion of this lower portion 38X. A portion of the lower portion 38X that covers the upper portion 34A of the anchor plate 34 functions as one end portion (of the inner boot) of the invention. Also, a portion of the upper portion 38Y that covers the buckle 32 functions as the other end portion (of the inner boot) of the invention. Furthermore, a portion of the lower portion 38X and a portion of the upper portion 38Y that covers the inner webbing 36 function as a middle portion (of the inner boot) of the invention.

Here, a single thin portion 52 is formed between the lower end portion 32A of the buckle 32 and the upper end portion of the upper portion 34A of the anchor plate 34, on a surface side of the seat-side side wall portion 38A of the inner boot 38 described above. This thin portion 52 is formed only on the seat-side side wall portion 38A side, and is not formed on the console-side side wall portion 38B, among the seat-side side wall portion 38A and the console-side side wall portion 38B. Also, the thin portion 52 is formed only at one location in the height direction of the seat-side side wall portion 38A. The one location in the height direction of the seat-side side wall portion 38A is positioned below (see FIG. 1) the upper end portion of the side surface 12A on the inside in the vehicle width direction of the seat cushion 12, when the height of the seat cushion 12 is maintained at a neutral (middle) position. Furthermore, a plate thickness t (see FIG. 6D) of the thin portion 52 is set to be slightly thicker than ½ of a plate thickness T of (a typical portion of) the seat-side side wall portion 38A. Also, the surface of the thin portion 52 is an arced surface. Moreover, the thin portion 52 is formed in the width direction of the inner webbing 36. In addition, the term "one location" of the invention means the inner boot 38 will bend at only one location in the height direction of the inner boot 38. Therefore, a mode in which only one thin portion 52 is provided on the surface side of the seat-side side wall portion 38A, as is the case in this example embodiment, may be considered to be an extreme example. In addition, even if two thin portions are arranged closed together by forming narrow grooves (i.e., grooves having narrow widths), the inner boot 38 would essentially still be regarded as bending at only one location, so this kind of mode may also be employed.

Further, the thin portion 52 described above is formed continuous with the front wall portion 38C and the rear wall portion 38D of the inner boot 38. Hereinafter, a thin portion formed on the front wall portion 38C will be referred to as the "front thin portion 54", and a thin portion formed on the rear wall portion 38D will be referred to as the "rear thin portion 56". The front thin portion 54 and the rear thin portion 56 do not cross the front wall portion 38C and the rear wall portion 38D, and thus do not reach the console-side side wall portion 38B. Also, the thin portion 52, the front thin portion 54, and the rear thin portion 56 are all formed at the same height. In this example embodiment, the front thin portion 54 and the rear thin portion 56 are formed on the front wall portion 38C and the rear wall portion 38D, respectively, but both do not necessarily have to be provided. It is sufficient that only the front thin portion 54 be provided.

Also, a plurality (five in this example embodiment) of ribs 58 that serve as reinforcing portions are integrally formed on a back surface side of the seat-side side wall portion 38A, between the thin portion 52 and the lower end portion 32A of the buckle 32. The ribs 58 are formed linearly (i.e., in straight lines) in the longitudinal direction of the inner webbing 36. Moreover, other ribs 60 are integrally formed with the console-side side wall portion 38B in positions opposing the ribs 58, on the back surface side of the console-side side wall portion 38B. However, the ribs 60 are longer than the ribs 58, and the ribs 58 are formed in a (generally) trapezoidal shape when viewed from the rear of the vehicle, while the ribs 60 are formed in a (generally) right-angled triangular shape when viewed from the rear of the vehicle. Also, the positions of the upper end portions of these ribs 58 and 60 are aligned at (substantially) the same height as the inner boot 38. The ribs 58 and the ribs 60 are arranged at a lower end portion of the upper portion 38Y, i.e., at a portion 62 that starts to become narrow to connect from the upper portion 38Y to the lower portion 38X. When the buckle 32 is inserted into the upper portion 38Y of the inner boot 38, the lower end portion 32A of the buckle 32 abuts against the upper end portions of these ribs 58 and 60, so the ribs 58 and 60 function as a stopper that prevents the buckle 32 from being inserted any further.

Also, the inner boot 38 is fixed to the anchor plate 34 by the structure described below. As shown in FIGS. 1, 3, 5, and 6A, a circular mounting seat 64 (see FIG. 6A) is formed on a lower end portion of the seat-side side wall portion 38A of the inner boot 38. A generally rectangular mounting hole 66 is formed in a center portion of this mounting seat 64. A mounting hole 46 is formed below the long hole 44, in the anchor plate 34, corresponding to this mounting hole 66. A clip 70 that serves as a fastener is inserted through the mounting hole 66 on the inner boot 38 side, and also inserted through the mounting hole 46 in the anchor plate 34, such that the seat-side side wall portion 38A of the inner boot 38 is fixed to the anchor plate 34. A tip end portion of the clip 70 is pointed toward the back surface of the console-side side wall portion 38B, and there is a slight gap between the two.

Figure 4:
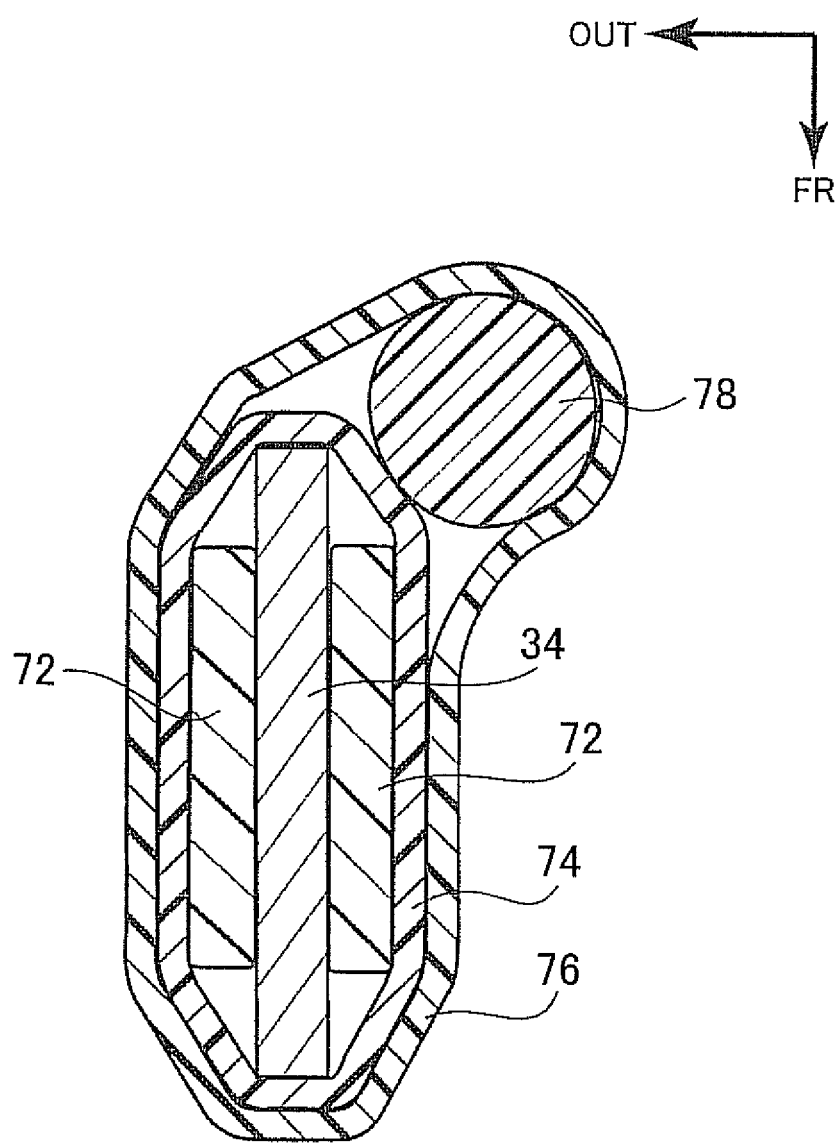
FIG. 4 is an enlarged transverse sectional view of the vehicle buckle support apparatus shown in FIG. 3 cut along line IV-IV in FIG. 3.

Moreover, a rectangular fixing piece 72 is integrally formed protruding from the lower end portion the seat-side side wall portion 38A and the lower end portion of the console-side side wall portion 38B. These fixing pieces 72 each have a width that is approximately one-half of the width of the lower portion 38X of the inner boot 38. As shown in FIGS. 3 and 4, when the anchor plate 34 is installed inside of the inner boot 38, these fixing pieces 72 tightly contact the front and back surfaces of the anchor plate 34. Also, inner tape 74 is wound around the two fixing pieces 72 that sandwich the anchor plate 34, joining them all together. The inner tape 74 is wound around the anchor plate 34 so as to have a joining surface with the anchor plate 34 both in the width direction and the protruding direction of the fixing pieces 72.

Moreover, a wire harness 78 is arranged inside of the lower portion 38X of the inner boot 38. A tip end portion of the wire harness 78 is connected to the buckle 32. Also, the wire harness 78 passes over the inner tape 74, and outer tape 76 is wound around it (i.e., the wire harness 78), fixing it to the anchor plate 34.

Next, the operation and effects of the example embodiment will be described.

The thin portion 52 is formed in the width direction of the inner webbing 36, at a single location between the upper end portion of the anchor plate 34 and the lower end portion 32A of the buckle 32, on the surface side of the seat-side side wall portion 38A of the inner boot 38. The thin portion 52 is not formed on the surface side of the console-side side wall portion 38B of the inner boot 38. Therefore, the inner boot 38 is less rigid at the thin portion 52 of the seat-side side wall portion 38A than at the console-side side wall portion 38B. Also, the inner boot 38 is less rigid at the thin portion 52 of the seat-side side wall portion 38A than at locations where the thin portion 52 of the seat-side side wall portion 38A is not provided. That is, the inner boot 38 bends easier at the position where the thin portion 52 is formed, and the load when the inner boot 38 bends is determined by the thickness and the material of the thin portion 52. As a result, when an occupant puts on the webbing 40, the inner boot 38 will bend toward the occupant at the thin portion 52, so the buckle 32 is able to be easily tilted toward the occupant. Therefore, the tongue plate 42 is able to smoothly engage with the buckle 32.

Also, the buckle 32 is inserted (i.e., fitted into) the upper portion 38Y of the inner boot 38, so the upper end portion side of the inner boot 38 is heavier than the lower end portion is. Therefore, when an occupant is not seated in the front passenger's seat and the seat belt apparatus of the front passenger's seat is not being used, the inner boot 38 tends to shake to the left and right (i.e., to the seat cushion 12 side and the console box 22 side) when it (i.e., the inner boot 38) receives vibrations when the vehicle is running. However, in this example embodiment, as described above, the thin portion 52 is formed on the surface side of the seat-side side wall portion 38A, but is not formed on the surface side of the console-side side wall portion 38B, so the inner boot 38 will bend relatively easily toward the seat cushion 12 side, but will not easily bend toward the console box 22 side. Further, the rigidity of the upper portion 38Y of the inner boot 38 is also increased by the ribs 58 and 60. Therefore, even if a gap 79 (see FIG. 1) between the upper end portion of the console-side side wall portion 38B of the inner boot 38 and the side surface 22A of the outside in the vehicle width direction of the console box 22 is narrow, when an occupant is not seated in the front passenger's seat and the seat belt apparatus of the front passenger's seat is not being used, the upper end portion (i.e., the buckle 32 side) of the inner boot 38 will not easily strike the side surface 22A on the outside in the vehicle width direction of the console box 22, so a rattling noise can be inhibited from being produced. In the description above, the inner boot 38 of the seat belt apparatus is described as being applied to a front passenger's seat, as an example.

Moreover, to obtain the foregoing operation, in the example embodiment, the shape and structure of the cylindrical inner boot 38 have been innovatively designed, so they will not lead to an increase in parts or a complex structure like the related art.

With the vehicle buckle support apparatus 30 according to this example embodiment, the shape and the structure of the inner boot 38 itself have been innovatively designed, so both an improvement in the wearability (i.e., the ease with which the webbing is able to be put on) when an occupant puts on the webbing, and a reduction in a rattle noise produced when the buckle 32 or the like abuts against the console box 22 when the vehicle is running, can be realized.

Also, the ribs 58 are integrally formed with the seat-side side wall portion 38A in the longitudinal direction of the inner webbing 36 between the thin portion 52 and the lower end portion 32A of the buckle 32, on the back surface side of the seat-side side wall portion 38A of the inner boot 38. Accordingly, the difference in rigidity between the portion where the thin portion 52 is formed and the portion where the ribs 58 are formed increases. Therefore, the inner boot 38 is extremely difficult to bend at portions other than the thin portion 52. As a result, according to this example embodiment, the bending position of the inner boot 38 is able to be stabilized even further.

Moreover, the ribs 60 are also formed at positions opposing the ribs 58, on the back surface side of the console-side side wall portion 38B, so the rigidity of the console-side side wall portion 38B of the inner boot 38 increases. Also, the combination of both the ribs 58 and 60 increases the overall rigidity of the upper portion 38Y of the inner boot 38. Therefore, the upper end portion of the inner boot 38 is even less apt to swing toward the console box 22 side when vibrations when the vehicle is running are input. As a result, with this example embodiment, rattling noise produced by the upper end portion of the inner boot 38 abutting against the console box 22 when the vehicle is running is able to be more effectively suppressed.

Also, the ribs 58 and 60 are all formed linearly, so when the buckle 32 is inserted into the upper portion 38Y of the inner boot 38, the lower end portion 32A of the buckle 32 interferes with the ribs 58 and 60. Therefore, the buckle 32 is unable to be inserted into the inner boot 38 any further, and as a result, the buckle 32 is positioned with respect to the inner boot 38. That is, the ribs 58 and 60 serve as a stopper. Thus, according to this example embodiment, the buckle 32 is able to be easily positioned with respect to the inner boot 38, which makes the assemblability of the vehicle buckle support apparatus 30 that much better.

Moreover, the front thin portion 54 and the rear thin portion 56 are additionally formed at the same height as the thin portion 52, on the front wall portion 38C and the rear wall portion 38D of the inner boot 38. Therefore, bulging at the front wall portion 38C and the rear wall portion 38D when the inner boot 38 is bent toward the occupant will not stand out. As a result, with this example embodiment, the quality of the external appearance of the inner boot 38 is able to be improved.

Also, the inner boot 38 is fixed to the anchor plate 34 by the clip 70 that is inserted from the seat-side side wall portion 38A toward the console-side side wall portion 38B. Therefore, the seat-side side wall portion 38A is securely fixed to the anchor plate 34, but the console-side side wall portion 38B is in an unstable state with respect to the anchor plate 34. However, in this example embodiment, both the fixing piece 72 of the seat-side side wall portion 38A and the fixing piece 72 of the console-side side wall portion 38B are joined together by the inner tape 74, so the lower end portion of the console-side side wall portion 38B of the inner boot 38 is also securely fixed to the anchor plate 34.

Furthermore, the wire harness 78 is joined to the anchor plate 34 by the outer tape 76, with the inner tape 74 interposed between the wire harness 78 and the anchor plate 34. Therefore, the wire harness 78 and the anchor plate 34 will not directly scrape against one another.

From the above, this example embodiment makes it possible to stabilize the mounting state of the inner boot 38, and inhibit or prevent abnormal noise from being produced between the wire harness 78 and the anchor plate 34.

Also, the fixing pieces 72, each of which is set to a width narrower than the width of the anchor plate 34, are integrally formed on the lower end portions of the seat-side side wall portion 38A and the console-side side wall portion 38B. The inner tape 74 is wound around the anchor plate 34 so as to have a joining surface with the anchor plate 34 in both the width direction and the protruding direction of the fixing pieces 72, so the joining surface is arranged around the fixing pieces 72. Therefore, the fixing pieces 72 are able to be strongly bound. As a result, with this example embodiment, the fixing pieces 72 are able to be effectively prevented from peeling away from the anchor plate 34 when vibrations when the vehicle is running are applied to the inner boot 38.

In the example embodiment described above (see FIG. 4), the inner tape 74 that fixes the pair of fixing pieces 72 to the anchor plate 34 is separate from the outer tape 76 that fixes the wire harness 78, but the invention is not limited to this. That is, inner tape and outer tape may also be formed by a single strip of tape 80. For example, in a modified example shown in FIG. 7, the pair of fixing pieces 72 is first joined to the anchor plate 34 by an inner portion 80A that serves as inner tape that is wound around the anchor plate 34. Then, the wire harness 78 is placed against the inner portion 80A and an outer portion 80B that serves as outer tape is wound around the inner portion 80A. This structure improves work efficiency.

Also, in the example embodiment described above, all of the pluralities of ribs 58 and 60 are linearly formed as reinforcing portions and other reinforcing portions, but the invention is not limited to this structure. For example, instead of being linear thin ribs, they may be band-shaped ribs with some width to them (i.e., wider than the thin ribs).

Moreover, in the example embodiment described above, the ribs 58 and 60 are provided on the seat-side side wall portion 38A and the console-side side wall portion 38B, but a structure without reinforcing portions may also be employed. Also, a structure in which reinforcing portions are provided only on the seat-side side wall portion may also be employed.

Further, in the example embodiment described above, the thin portion 52, the front thin portion 54, and the rear thin portion 56 are formed on three surfaces, i.e., the seat-side side wall portion 38A, the front wall portion 38C, and the rear wall portion 38D, respectively, but the invention is not limited to this. That is, the thin portion 52 may also be provided only on the seat-side side wall portion 38A.

What is claimed is:

1. A vehicle buckle support apparatus comprising:
   an inner webbing that connects a buckle that is arranged between a console box and a seat cushion to an anchor plate;
   a resin inner boot that is formed in a cylindrical shape, in which the anchor plate protrudes from one end portion of the inner boot, the inner webbing is housed in a middle portion of the inner boot, and the buckle is inserted into the other end portion of the inner boot, that keeps the buckle in an upright position, the inner boot including a seat-side side wall portion that opposes a side surface of the seat cushion, and a console-side side wall portion that opposes a side surface of the console box;
   a thin portion that is formed in a width direction of the inner webbing, between an upper end portion of the anchor plate and a lower end portion of the buckle, on a surface side of the seat-side side wall portion, among the seat-side side wall portion and the console-side side wall portion; and
   a reinforcing portion that is integrally formed with the seat-side side wall portion in a longitudinal direction of the inner webbing, between the thin portion and the lower end portion of the buckle, on a back surface side of the seat-side wall portion.

2. The vehicle buckle support apparatus according to claim 1, wherein another reinforcing portion that is different from the reinforcing portion is also formed in a position opposing the reinforcing portion, on a back surface side of the console-side side wall portion.

3. The vehicle buckle support apparatus according to claim 2, wherein the reinforcing portion and the other reinforcing portion are each a plurality of ribs formed linearly, and the ribs serve as a stopper that interferes with the lower end portion of the buckle when the buckle is inserted into the other end portion of the inner boot.

4. The vehicle buckle support apparatus according to claim 3, wherein a position of an upper end portion of reinforcing portion and a position of an upper end portion of the other reinforcing portion are aligned at substantially the same height as the inner boot.

5. The vehicle buckle support apparatus according to claim 1, wherein the inner boot includes a front wall portion and a rear wall portion that curve from both sides of the seat-side side wall portion toward the console box side; and another thin portion is formed at the same height as the thin portion, on at least the front wall portion, from among the front wall portion and the rear wall portion.

6. The vehicle buckle support apparatus according to claim 5, wherein the thin portion and the other thin portion that is formed on at least the front wall portion are formed continuous.

7. The vehicle buckle support apparatus according to claim 1, wherein a thickness of a portion of the seat-side side wall portion where the thin portion is formed has a thickness that is greater than ½ of a thickness of a typical portion of a portion of the seat-side side wall portion where the thin portion is not formed.

8. The vehicle buckle support apparatus according to claim 1, wherein a surface of the thin portion is an arced surface.

9. The vehicle buckle support apparatus according to claim 1, wherein the thin portion is formed by only a single groove.

10. The vehicle buckle support apparatus according to claim 1, wherein the thin portion is formed by two grooves arranged close together.

11. The vehicle buckle support apparatus according to claim 1, wherein the thin portion is formed only in a position lower than a height of an upper end portion of the seat cushion, when the seat cushion is maintained in a neutral position.

12. The vehicle buckle support apparatus according to claim 1, wherein the inner boot is fixed to the anchor plate by a fastener that is inserted from one of the seat-side side wall portion and the console-side side wall portion toward the other; a lower end portion of the seat-side side wall portion and a lower end portion of the console-side side wall portion are joined to the anchor plate by inner tape; a wire harness is joined to the anchor plate by the inner tape and outer tape.

13. The vehicle buckle support apparatus according to claim 12, wherein a fixing piece set to a width narrower than the width of the anchor plate is integrally formed on both a lower end portion of the seat-side side wall portion and a lower end portion of the console-side side wall portion; and the inner tape is wound around the anchor plate so as to have a joining surface with the anchor plate in both a width direction and a protruding direction of the fixing pieces.

14. A vehicle buckle support apparatus comprising:
   an inner webbing that connects a buckle that is arranged between a console box and a seat cushion to an anchor plate;
   a resin inner boot that is formed in a cylindrical shape, in which the anchor plate protrudes from one end portion of the inner boot, the inner webbing is housed in a middle portion of the inner boot, and the buckle is inserted into the other end portion of the inner boot, that keeps the buckle in an upright position, the inner boot including a seat-side side wall portion that opposes a side surface of the seat cushion, and a console-side side wall portion that opposes a side surface of the console box;
   a thin portion that is formed in a width direction of the inner webbing, between an upper end portion of the anchor plate and a lower end portion of the buckle, on a surface side of the seat-side side wall portion, among the seat-side side wall portion and the console-side side wall portion;
   wherein the inner boot includes a front wall portion and a rear wall portion that curve from both sides of the seat-side side wall portion toward the console box side; and another thin portion is formed at the same height as the thin portion, on at least the front wall portion, from among the front wall portion and the rear wall portion.

15. The vehicle buckle support apparatus according to claim 14, wherein the thin portion and the other thin portion that is formed on at least the front wall portion are formed continuous.

16. A vehicle buckle support apparatus comprising:
   an inner webbing that connects a buckle that is arranged between a console box and a seat cushion to an anchor plate;
   a resin inner boot that is formed in a cylindrical shape, in which the anchor plate protrudes from one end portion of the inner boot, the inner webbing is housed in a middle portion of the inner boot, and the buckle is inserted into the other end portion of the inner boot, that keeps the buckle in an upright position, the inner boot including a seat-side side wall portion that opposes a side surface of the seat cushion, and a console-side side wall portion that opposes a side surface of the console box;

a thin portion that is formed in a width direction of the inner webbing, between an upper end portion of the anchor plate and a lower end portion of the buckle, on a surface side of the seat-side side wall portion, among the seat-side side wall portion and the console-side side wall portion;

wherein the inner boot is fixed to the anchor plate by a fastener that is inserted from one of the seat-side side wall portion and the console-side side wall portion toward the other; a lower end portion of the seat-side side wall portion and a lower end portion of the console-side side wall portion are joined to the anchor plate by inner tape; a wire harness is joined to the anchor plate by the inner tape and outer tape.

17. The vehicle buckle support apparatus according to claim 16, wherein a fixing piece set to a width narrower than the width of the anchor plate is integrally formed on both a lower end portion of the seat-side side wall portion and a lower end portion of the console-side side wall portion; and the inner tape is wound around the anchor plate so as to have a joining surface with the anchor plate in both a width direction and a protruding direction of the fixing pieces.

* * * * *